2,879,290
Patented Mar. 24, 1959

2,879,290

3-[N,N-DI-(LOWER ALKYL)-CARBAMYL]-2-ACYLOXYBIPHENYL COMPOUNDS

Burris D. Tiffany, Kalamazoo, Mich., assignor to The Upjohn Company, Kalamazoo, Mich., a corporation of Michigan No Drawing. Application December 5, 1955
Serial No. 550,835

2 Claims. (Cl. 260—479)

This invention relates to organic compounds of the biphenyl series and is more particularly concerned with certain 3 - [N,N-di-(lower-alkyl)-carbamyl]-2-acyloxybiphenyl compounds of the structural formula

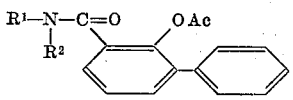

wherein $R^1$ and $R^2$ are lower-alkyl radicals containing from one to six carbon atoms, inclusive, and OAc is an acyloxy radical, Ac being an acyl radical selected from the group consisting of di-(hydrocarbyl)-acetyl-, tri-(hydrocarbyl)-acetyl-, di-(hydrocarbyl)-propionyl-, tri-(hydrocarbyl)-propionyl-, and cyclic-hydrocarbylene-acetyl-, in which the hydrocarbyl radical contains from one to eight carbon atoms, inclusive, and the hydrocarbylene radical contains from two to sixteen carbon atoms, inclusive.

The term "hydrocarbyl" is defined as the monovalent radical of a hydrocarbon compound having one unoccupied valence bond on a carbon atom. The term "hydrocarbylene" is defined as the polyvalent radical of a hydrocarbon compound having at least one unoccupied valence bond on each of two different carbon atoms, and the term "cyclic-hydrocarbylene-acetyl" is defined as a ring-containing radical of the formula

wherein R is a hydrocarbylene radical. It is to be understood that when

in the foregoing formula is a phenyl radical, the phenyl radical contains at least one substituent other than hydrogen in ortho position to the phenyl radical carbon atom which is part of the acetyl radical. Preparable are compounds in which the hydrocarbyl and hydrocarbylene radicals can have substituents containing atoms other than carbon and hydrogen, e.g., substituents such as alkanoylamido (e.g. acetamido), aryloylamido (e.g. benzamido), alkanoyloxy (e.g. acetoxy), aryloyloxy (e.g. benzoyloxy), alkanoyl (e.g. acetyl), aryloyl (e.g. benzoyl), alkoxy (e.g. methoxy), aryloxy (e.g. phenoxy), alkylmercapto (e.g. methylmercapto), arylmercapto (e.g. phenylmercapto), carboalkoxy (e.g. carbomethoxy), carboaryloxy (e.g. carbophenoxy), etc. and in which the carbon chain of said hydrocarbylene radical can be interrupted by a hetero atom, e.g. oxygen, nitrogen, sulfur, etc.

Typical compounds of the present invention are 3-(N,N-dimethylcarbamyl)-2-(diethylacetoxy)-biphenyl, 3-(N,N-dimethylcarbamyl) - 2 - (trimethylacetoxy) - biphenyl, 3-(N,N - dimethylcarbamyl) - 2 - [o,o'-dimethyl-p-(n-propoxy) - benzoyloxy] - biphenyl, 3 - (N - ethyl - N-methylcarbamyl) - 2 - (p-acetamidosalicyloyloxy) - biphenyl, 3-(N,N - diethylcarbamyl) - 2 - diphenylacetoxybiphenyl, 3-[N,N - di - (n - propyl) - carbamyl] - 2 - (α - isopropylpropionyloxy) - biphenyl, 3 - (N,N-diisopropylcarbamyl)-2 - (α - cyclopentylpropionyloxy) - biphenyl, 3-[N,N-di-(n - butyl) - carbamyl] - 2 - (α - naphthoyloxy)-biphenyl, 3-[N,N - di - (n - pentyl) - carbamyl] - 2 - cyclopentanecarbonyloxybiphenyl, 3 - [N,N - di - (n - hexyl) - carbamyl] - 2 - (β - phenyl - β - cyclopentylpropionyloxy)-biphenyl, 3 - [N - methyl - N - (n-propyl)-carbamyl]-2-(β-methyloctanoyloxy) - biphenyl, 3 - (N,N - diisohexylcarbamyl) - 2 - (β - naphthoyloxy) - biphenyl, 3 - [N,N - di-(secondary-butyl) - carbamyl] - 2 - (α - phenyl-β-phenylpropionyloxy) - biphenyl, 3 - (N,N-dimethylcarbamyl)-2-(o - methylmercaptobenzoyloxy) - biphenyl, 3 - (N,N-dimethylcarbamyl) - 2 - [α - (p-benzoyloxyphenyl)-butyryloxy] - biphenyl, 3 - (N,N-dimethylcarbamyl) - 2 - [α-(p-carbomethoxyphenyl) - propionyloxy] - biphenyl, 3-(N,N-dimethylcarbamyl) - 2 - (o-phenoxybenzoyloxy)-biphenyl, 3 - (N,N - dimethylcarbamyl) - 2 - (o-phenylmercaptobenzoyloxy) - biphenyl, 3 - (N,N - dimethylcarbamyl)-2-[α - (N-pyrrolidyl) - propionyloxy] - biphenyl, 3 - (N,N-dimethylcarbamyl) - 2 - [α-(N-morpholinyl)-butyryloxy]-biphenyl, 3 - (N,N - dimethylcarbamyl) - 2 - di-(α-furyl)-acetoxybiphenyl, 3 - (N,N - dimethylcarbamyl) - 2 - di-(α-thienyl) - acetoxybiphenyl, 3 - (N,N - dimethylcarbamyl)-2 - [(2 - methyl - 3 - indolyl)-acetoxy]-biphenyl, 3-(N,N-diethylcarbamyl) - 2 - diethylacetoxybiphenyl, 3-(N-ethyl-N-methylcarbamyl)-2-trimethylacetoxybiphenyl, 3-[N,N-di - (n - propyl) - carbamyl] - 2 - salicyloyloxybiphenyl, 3-(N,N - diisopropylcarbamyl) - 2 - benzhydrylacetoxybiphenyl, 3 - [N,N - di - (n - butyl) - carbamyl] - 2 - trimethylacetoxybiphenyl, 3 - [N,N - di - (n - hexyl) - carbamyl] - 2 - diethylacetoxybiphenyl.

It is an object of the present invention to provide the above-defined compounds which are superior analgetic agents. These compounds have a high and prolonged analgetic effect, and also an antipyretic effect. They are relatively free from undesirable side effects, e.g., they produce little or no irritation on administration or subsequent thereto, and, in addition, they are stable in pharmaceutical formulations, particularly liquid formulations. The compounds of the present invention can be administered orally, rectally, by injection, etc. as tablets, capsules, suppositories, elixirs, aqueous and non-aqueous suspensions, sterile solutions, etc. Other objects and uses of the present invention will be apparent to one skilled in the art.

The 3 - [N,N - di-(lower-alkyl)-carbamyl]-2-acyloxybiphenyl compounds of the present invention are prepared by acylation with an acylating agent having an acyl group of formula Ac, Ac being defined as previously, of the 2-hydroxy group in a starting 3-[N,N-di-(lower-alkyl)-carbamyl]-2-hydroxybiphenyl wherein a lower-alkyl radical contains from one to six carbon atoms, inclusive. Typical acylating agents are acid halides of formula AcX and acid anhydrides of formula $Ac_2O$ wherein X is selected from bromide and chlorine and Ac is defined as previously. Use of about one to about 1.25 moles of acylating agent per mole of starting biphenyl is preferred. However, up to two moles or more of acylating agent per mole of starting biphenyl can be used. When an acid halide is employed, it is preferred to include in the reaction mixture an acid acceptor compound, preferably a tertiary amine, e.g. pyridine, collidine, triethylamine, etc., to form a salt with the hydrogen halide as it is formed in the reaction mixture. Basic inorganic salts, e.g. sodium carbonate, potassium carbonate, calcium carbonate, sodium bicarbonate, etc. can also be employed as an acid acceptor compound. When an acid anhydride is employed, it is preferred to use an acid catalyst, e.g., sulfuric acid, hydrochloric acid, acetic acid, p-toluene-sulfonic acid, etc., in trace amounts. It is generally preferred to carry out the acylation in the presence of a solvent, e.g. benzene, toluene, methylene dichloride, chloroform, etc.

In carrying out the reaction the starting biphenyl, acylating agent, catalyst (when employed) and solvent (when employed) are mixed at a temperature from about zero degrees to about 200 degrees centigrade for a period of about ten minutes to about 24 hours, the length of time of reaction and the temperature being in a large part dependent on the reactivity of the acylating agent. After completion of the reaction, the desired biphenyl compounds of the invention are isolated from the reaction mixture and purified, e.g. by the typical procedures shown in the examples.

The 3 - [N,N - di - (lower - alkyl) - carbamyl] - 2 - hydroxybiphenyl starting compounds for the present invention are prepared from 3-carboxy-2-hydroxybiphenyl (German Patent 61,125) by first reacting with a strong acid halide, e.g. thionyl chloride, thionyl bromide, phosphorus pentachloride, phosphorus pentabromide, oxalyl chloride, etc., to obtain an acid halide of 3-carboxy-2-hydroxybiphenyl, which biphenyl acid halide is then reacted with a di-(lower-alkyl)-amine wherein a loweralkyl group contains from one to six carbon atoms, inclusive, to obtain the desired starting compound.

The following examples are illustrative only and are not to be construed as limiting the scope of the invention.

EXAMPLE 1

*3-(N,N-dimethylcarbamyl)-2-(diethylacetoxy)-biphenyl*

In a 250-milliliter, three-neck flask equipped with mechanical stirrer, thermometer, condenser, and dropping funnel, a mixture of 12.1 grams (0.050 mole) of 3-(N,N-dimethylcarbamyl)-2-hydroxybiphenyl and fifteen milliliters of pyridine cooled to five degrees centigrade in ice, is treated dropwise, with stirring, with a solution of 7.4 grams (0.055 mole) of diethylacetyl chloride in 25 milliliters of benzene during a period of fifteen minutes. The resulting mixture is stirred at five degrees centigrade for one hour, then diluted with 25 milliliters of benzene and stirred 1.5 hours at room temperature. The mixture is then washed with five 25-milliliter portions of water, dried over anhydrous sodium sulfate, and concentrated to a yellow syrup which slowly crystallizes. The crystals are triturated with a mixture of hexanes (Skellysolve B), collected on a filter, and recrystallized from fresh solvent, giving 12.6 grams (ninety percent yield), M.P. 60-64 degrees centigrade, of 3-(N,N-dimethylcarbamyl)-2-(diethylacetoxy)-biphenyl. Recrystallization twice more gives an analytical sample, M.P. 61-63 degrees centigrade.

*Analysis.*—Calcd. for $C_{21}H_{25}NO_3$: C, 74.31; H, 7.42; N, 4.13. Found: C, 74.30; H, 7.64; N, 4.22.

EXAMPLE 2

*3-(N,N-dimethylcarbamyl)-2-(trimethylacetoxy)-biphenyl*

In a 500-milliliter, three-neck flask equipped with mechanical stirrer, condenser with drying tube, thermometer, and dropping funnel, fifteen milliliters of anhydrous pyridine is added to 12.1 grams (0.050 mole) of 3-(N,N-dimethylcarbamyl)-2-hydroxybiphenyl causing much of the latter to dissolve. Then with stirring at room temperature a solution of 6.6 grams (7.4 milliliters, 0.055 mole) of trimethylacetyl chloride in 25 milliliters of benzene is added during a period of about fifteen minutes, causing no significant change in temperature. A small amount of precipitate separates during the addition and increases rapidly while the mixture is heated under reflux for a period of 1.5 hours. The mixture is cooled below ten degrees centigrade and 25 milliliters of water is added. The layers are separated and the organic layer is extracted with 25 milliliters of water, three 25-milliliter portions of 1 N hydrochloric acid, and three 25-milliliter portions of water. The benzene solution is then dried over sodium sulfate, filtered, and concentrated under nitrogen on the steam bath to a clear, almost colorless oil. After long standing this crystallizes to a solid mass which is recrystallized from 120 milliliters of hexane mixture (Skellysolve B), giving 14.1 grams (87 percent yield) of long white needles, M.P. 103–105 degrees centigrade, of 3 - (N,N - dimethylcarbamyl) - 2 - (trimethylacetoxy)-biphenyl. A 0.2-gram sample recrystallized three times from fresh solvent gives the same melting point, 103–105 degrees centigrade. The compound gives no color with ferric chloride reagent.

*Analysis.*—Calcd. for $C_{20}H_{23}NO_3$: C, 73.81; H, 7.13; N, 4.31. Found: C, 73.70; H, 6.97; N, 4.31.

EXAMPLE 3

*3-(N,N-dimethylcarbamyl)-2-[o,o'-dimethyl-p-(n-propoxy)-benzoyloxy]-biphenyl*

In a 250-milliliter, three-neck flask equipped with mechanical stirrer, condenser with drying tube, thermometer, and dropping funnel, a mixture of 12.1 grams (0.050 mole) of 3-(N,N-dimethylcarbamyl)-2-hydroxybiphenyl, fifteen milliliters of anhydrous pyridine, and 25 milliliters of benzene is treated dropwise with stirring with a solution of 12.5 grams (0.055 mole) of o,o'-dimethyl-p-(n-propoxy)-benzoyl chloride in 25 milliliters of benzene and the mixture is heated for a period of two hours under reflux with continued stirring. The precipitate of pyridine hydrochloride which separates is removed by extraction with 25 milliliters of water. The organic solution is diluted with 25 milliliters of benzene, washed with four 25-milliliter portions of 1 N hydrochloric acid (until definitely acidic), and finally washed with water until neutral. The solution is dried over anhydrous sodium sulfate and concentrated to a red syrup which crystallizes after standing three weeks at room temperature. When crystallization begins, 25 milliliters of benzene is added and then hexane mixture (Skellysolve B) is added in portions as crystallization proceeds. The mixture is finally cooled to zero degrees centigrade and the crystals are collected, washed, and dried, giving 18.2 grams (84 percent yield), M.P. 106-110 degrees centigrade, of 3 - N,N - dimethylcarbamyl) - 2 - [o,o' - dimethyl - p - (n - propoxy) - benzoyloxy] - biphenyl. Recrystallization twice from methylene chloride hexane (Skellysolve B) mixture gives an analytical sample, M.P. 107-111 degrees centigrade, a sample of which fails to give any detectable color change with ferric chloride reagent whereas the starting compound gives an intense purple color in the same test.

*Analysis.*—Calcd. for $C_{27}H_{29}NO_4$: C, 75.15; H. 6.77; N, 3.25. Found: C, 75.37; H, 7.15; N, 3.35.

EXAMPLE 4

*3-(N,N-dimethylcarbamyl)-2-[o,o'-dimethyl-p-(n-propoxy)-benzoyloxy]-biphenyl*

Following the exact procedure of Example 3, but substituting o,o'-dimethyl-p-(n-propoxy)-benzoic anhydride for the corresponding benzoyl chloride, using a few drops of sulfuric acid in place of the pyridine, omitting the water extraction of pyridine hydrochloride, and washing with aqueous five percent sodium bicarbonate solution instead of 1 N hydrochloric acid, also provides the desired 3 - (N,N - dimethylcarbamyl) - 2 - [o,o' - dimethyl - p - (n-propoxy)-benzoyloxy]-biphenyl.

EXAMPLES 5–30

The 3 - [N,N - di - (lower - alkyl) - carbamyl] - 2 - acyloxybiphenyls of the present invention shown in the table are prepared using the procedure of Example 1, 2, 3 or 4, as specified in the table, by substituting the starting biphenyl compound and acylating agent specified in the table for those specified in Example 1, 2, 3 or 4.

TABLE

| | Procedure of Example | Starting 3-[N,N-di-(lower-alkyl)-carbamyl]-2-hydroxybiphenyl | Acylating Agent | 3-[N,N-di-(lower-alkyl)-carbamyl]-2-acyloxybiphenyl product |
|---|---|---|---|---|
| Example 5 | 3 | 3-(N-ethyl-N-methylcarbamyl)-2-hydroxybiphenyl. | p-acetamidosalicyloyl chloride. | 3-(N-ethyl-N-methylcarbamyl)-2-(p-acetamidosalicyloyloxy)-biphenyl. |
| Example 6 | 2 | 3-(N,N-diethylcarbamyl)-2-hydroxybiphenyl. | diphenylacetyl bromide. | 3-(N,N-diethylcarbamyl)-2-diphenylacetoxybiphenyl. |
| Example 7 | 2 | 3-[N,N-di-(n-propyl)-carbamyl]-2-hydroxybiphenyl. | $\alpha$-isopropylpropionyl chloride. | 3-[N,N-di(n-propyl)-carbamyl]-2-($\alpha$-isopropylpropionyloxy)-biphenyl. |
| Example 8 | 2 | 3-(N,N-diisopropylcarbamyl)-2-hydroxybiphenyl. | $\alpha$-cyclopentylpropionyl bromide. | 3-(N,N-diisopropylcarbamyl)-2-($\alpha$-cyclopentylpropionyloxy)-biphenyl. |
| Example 9 | 3 | 3-[N,N-di-(n-butyl)-carbamyl]-2-hydroxybiphenyl. | $\alpha$-naphthoyl chloride. | 3-[N,N-di-(n-butyl)-carbamyl]-2-($\alpha$-naphthoyloxy)-biphenyl. |
| Example 10 | 1 | 3-[N,N-di-(n-pentyl)-carbamyl]-2-hydroxybiphenyl. | cyclopentanecarbonylchloride. | 3-[N,N-di-(n-pentyl)-carbamyl]-2-cyclopentanecarbonyloxybiphenyl. |
| Example 11 | 3 | 3-[N,N-di-(n-hexyl)-carbamyl]-2-hydroxybiphenyl. | $\beta$-phenyl-$\beta$-cyclopentylpropionylchloride. | 3-[N,N-di-(n-hexyl)-carbamyl]-2-($\beta$-phenyl-$\beta$-cyclopentylpropionyloxy)-biphenyl. |
| Example 12 | 2 | 3-[N-methyl-N-(n-propyl)-carbamyl]-2-hydroxybiphenyl. | $\beta$-methyloctanoyl chloride. | 3-[N-methyl-N-(n-propyl)-carbamyl]-2-($\beta$-methyloctanoyloxy)-biphenyl. |
| Example 13 | 4 | 3-(N,N-diisohexylcarbamyl)-2-hydroxybiphenyl. | $\beta$-naphthoic anhydride. | 3-(N,N-diisohexylcarbamyl)-2-($\beta$-naphthoyloxy)-biphenyl. |
| Example 14 | 3 | 3-[N,N-di-(secondary-butyl)-carbamyl]-2-hydroxybiphenyl. | $\alpha$-phenyl-$\beta$-phenylpropionyl chloride. | 3-[N,N-di-(secondary-butyl)-carbamyl]-2-($\alpha$-phenyl-$\beta$-phenylpropionyloxy)-biphenyl. |
| Example 15 | 4 | 3-(N,N-dimethylcarbamyl)-2-hydroxybiphenyl. | o-methylmercaptobenzoic anhydride. | 3-(N,N-dimethylcarbamyl)-2-(o-methylmercaptobenzoyloxy)-biphenyl. |
| Example 16 | 3 | do | $\alpha$-(p-benzoyloxyphenyl)-butyrylchloride. | 3-(N,N-dimethylcarbamyl)-2-[$\alpha$-(p-benzoyloxyphenyl)-butyryloxy]-biphenyl. |
| Example 17 | 3 | do | $\alpha$-(p-carbomethoxyphenyl)-propionyl chloride. | 3-(N,N-dimethylcarbamyl)-2-[$\alpha$-(p-carbomethoxyphenyl)-propionyloxy)-biphenyl. |
| Example 18 | 1 | do | o-phenoxybenzoyl chloride. | 3-(N,N-dimethylcarbamyl)-2-(o-phenoxybenzoyloxy)-biphenyl. |
| Example 19 | 1 | do | o-phenylmercaptobenzoyl chloride. | 3-(N,N-dimethylcarbamyl)-2-(o-phenylmercaptobenzoyloxy)-biphenyl. |
| Example 20 | 3 | do | $\alpha$-(N,N-pyrrolidyl)-propionyl chloride. | 3-(N,N-dimethylcarbamyl)-2-[$\alpha$-(N-pyrrolidyl)-propionyloxy]-biphenyl. |
| Example 21 | 3 | do | $\alpha$-(N-morpholinyl)-butyryl chloride. | 3-(N,N-dimethylcarbamyl)-2-[$\alpha$-(N-morpholinyl)-butyryloxy]-biphenyl. |
| Example 22 | 2 | do | di-($\alpha$-furyl)-acetyl chloride. | 3-(N,N-dimethylcarbamyl)-2-di-($\alpha$-furyl)-acetoxybiphenyl. |
| Example 23 | 2 | do | di-($\alpha$-thienyl)-acetyl chloride. | 3-(N,N-dimethylcarbamyl)-2-di-($\alpha$-thienyl)-acetoxybiphenyl. |
| Example 24 | 2 | do | (2-methyl-3-indolyl)-acetyl chloride. | 3-(N,N-dimethylcarbamyl)-2-[(2-methyl-3-indolyl)-acetoxy]-biphenyl. |
| Example 25 | 1 | 3-(N-ethyl-N-methyl-carbamyl)-2-hydroxybiphenyl. | trimethylacetyl bromide. | 3-(N-ethyl-N-methylcarbamyl)-2-trimethylacetoxybiphenyl. |
| Example 26 | 1 | 3-(N,N-diethylcarbamyl)-2-hydroxybiphenyl. | diethylacetyl chloride. | 3-(N,N-diethylcarbamyl)-2-diethylacetoxybiphenyl. |
| Example 27 | 4 | 3-[N,N-di-(n-propyl)-carbamyl]-2-hydroxybiphenyl. | salicylic anhydride. | 3-[N,N-di-(n-propyl)-carbamyl]-2-salicyloyloxybiphenyl. |
| Example 28 | 2 | 3-(N,N-diisopropylcarbamyl)-2-hydroxybiphenyl. | benzhydrylacetyl chloride. | 3-(N,N-diisopropylcarbamyl)-2-benzhydrylacetoxybiphenyl. |
| Example 29 | 2 | 3-[N,N-di-(n-butyl)-carbamyl]-2-hydroxybiphenyl. | trimethylacetyl bromide. | 3-[N,N-di-(n-butyl)-carbamyl]-2-trimethylacetoxybiphenyl. |
| Example 30 | 1 | 3-[N,N-di-(n-hexyl)-carbamyl]-2-hydroxybiphenyl. | diethylacetyl chloride. | 3-[N,N-di-(n-hexyl)-carbamyl]-2-diethylacetoxybiphenyl. |

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. 3-(N,N-dimethylcarbamyl)-2-(diethylacetoxy)-biphenyl.
2. 3-[N,N-di(lower alkyl)-carbamyl]-2-(diethylacetoxy)-biphenyl.

References Cited in the file of this patent

UNITED STATES PATENTS 2,744,916   Sahyun et al.   May 8, 1956

OTHER REFERENCES

Pierce et al.: J. Am. Chem. Soc., 64, 1691-4 (1942).
Way et al.: J. Pharmacology and Experimental Therapeutics, 108, 450 to 460 (1953).
Rabjohn et al.: J. Org. Chem., 20, 271-3 (1955).